United States Patent [19]
Ohta et al.

[11] Patent Number: 5,617,251
[45] Date of Patent: Apr. 1, 1997

[54] FLAT LIGHTING DEVICE

[75] Inventors: Kazushige Ohta, Hadano; Koichi Hanasaki, Yokohama; Satoru Konishi, Hadano, all of Japan

[73] Assignee: Stanley Electric Co., Ltd., Tokyo, Japan

[21] Appl. No.: 577,387

[22] Filed: Dec. 22, 1995

[30] Foreign Application Priority Data

Dec. 26, 1994 [JP] Japan .................................. 6-336571

[51] Int. Cl.$^6$ .............................. G02B 5/02; G02B 5/00; F21V 7/04
[52] U.S. Cl. .............................. 359/599; 362/31; 362/32; 349/61
[58] Field of Search ........................ 359/599, 70, 48–50; 362/24, 26–27, 31, 32, 84; 385/36, 115

[56] References Cited

U.S. PATENT DOCUMENTS

| 4,714,983 | 12/1987 | Lang | 362/31 |
| 4,974,122 | 11/1990 | Shaw | 362/27 |
| 5,040,098 | 8/1991 | Tanaka et al. | 362/26 |
| 5,404,277 | 4/1995 | Lindblad | 359/49 |
| 5,485,354 | 1/1996 | Ciupke et al. | 359/49 |

FOREIGN PATENT DOCUMENTS 0584545  3/1994  European Pat. Off. .
WO9423244 10/1994 WIPO .

Primary Examiner—Thong Nguyen
Attorney, Agent, or Firm—Weingarten, Schurgin, Gagnebin & Hayes LLP

[57] ABSTRACT

An improved flat lighting device is provided. The flat lighting device comprises a light transmission member having a luminous surface formed on the front side thereof, a reflection surface on the rear side of said luminous surface, and an incident surface, and further comprises a light source and a reflecting mirror in the vicinity of the side perpendicular to said luminous surface. The thickness of the light transmission member between the luminous surface and the reflection surface is increased wider than that of the incident surface, the lower end of said incident surface is in contact with the reflection surface, said light source and said reflecting mirror are provided closer to the center of the light transmission member inside the end of the luminous surface, said inclined surface is formed by connecting the upper end of the incident surface and the end of the luminous surface, and said inclined surface is provided with a reflection function. According to the invention, the luminous surface can be more luminous owing to reflection by the inclined surface, and the flat lighting device itself can be formed so that the area is approximately equal to the display area of a liquid crystal display for lighting.

2 Claims, 3 Drawing Sheets

FLAT LIGHTING DEVICE

BACKGROUND OF THE INVENTION

1. Field of the Invention

The invention relates to a flat lighting device to be used as a back light for a liquid crystal display to be suitably used for an apparatus for a display device of a portable or automobile mounted television receiver or a portable personal computer or the like.

2. Background Art

FIG. 6 shows an example of the constitution of the above-described type of conventional flat lighting device 90. The flat lighting device 90 is constituted by a light transmission member 91 formed by transparent material having a high refractive index such as methacrylic resin, a light source 92 such as a cold cathode fluorescent lamp and a reflecting mirror 93 covering said light source 92.

The front side of said light transmission member 91 functions as a luminous surface 91a with the area approximately equal to the area of the display space of a liquid crystal display 81 for lighting, and on a reflection surface 91b which is the rear side of the luminous surface 91a, for example a dotted reflecting pattern 94 is formed by white ink.

The lateral side of said light transmission member 91 formed approximately perpendicularly to the luminous surface 91a functions as an incident surface 91c, the above-described light source 92 is confronted with the incident surface 91c, and a reflecting mirror 93 for reflecting light emitted from the light source 92 and advancing in the direction other than the incident surface 91c toward the incident surface 91c is attached utilizing the thickness of the light transmission member.

Therefore, in the conventional flat lighting device 90, said light transmission member 91 is basically formed in the shape of a rectangular parallelepiped or a thick plate. A diffusion plate 82, for example milky for diffusing light is provided between said luminous surface 91a and the liquid crystal display 81 for removing unevenness of light. A reflecting plate 83, for example formed by a mirror is provided at the rear of said reflecting pattern 94 on the side of the reflection surface 91b for preventing light from being lost through the reflection surface 91b.

However, in the above-described conventional flat lighting device 90, the width W1 of the flat lighting device 90 when said light source 92 and the reflecting mirror 93 are attached in the vicinity of the incident surface 91c is wider than the width W2 of the liquid crystal display 81 because said light transmission member 91 is formed in the shape of a rectangular parallelepiped. Therefore the frame around the display area is large compared with the display area when the flat lighting device and the liquid crystal display are integrated in a case and form, for example a display of a portable television, which causes the entire display to be large and solution of such a problem is desired.

SUMMARY OF THE INVENTION

The object of the invention is to provide a flat lighting device comprising a light transmission member formed by transparent material having a high refractive index, the lighting transmission member having a luminous surface with the area approximately equal to the area of a display device for lighting the front side thereof, a reflection surface on the rear side thereof and an incident surface perpendicular to the luminous surface, a light source and a reflecting mirror in the vicinity, the flat lighting device being characterized in that the light transmission member between the luminous surface and the reflection surface is thickened wider than the width of the incident surface, the light source and the reflecting mirror in the vicinity of the incident surface of which lower end is in contact with the reflection surface are provided closer to the center of the light transmission member inside the end of the above-described luminous surface, an inclined surface is formed by connecting the upper end of the incident surface and the end of the luminous surface, and the inclined surface is provided with a reflection function, and thereby the above-described problem of the conventional flat lighting device can be solved.

DETAILED DESCRIPTION OF THE PREFERRED EMBODIMENTS

Figure 1:
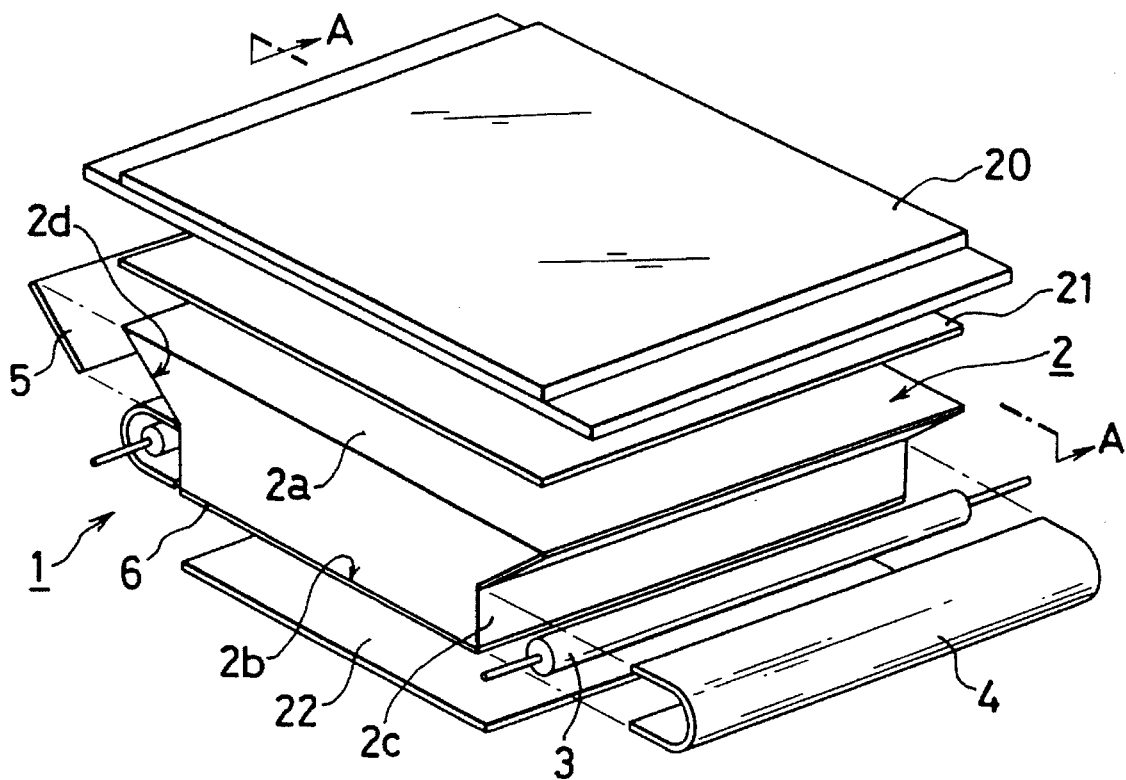
FIG. 1 is a perspective view showing a flat lighting device according to an embodiment of the invention in a condition in which a part of the above-described apparatus is disassembled.
Figure 2:
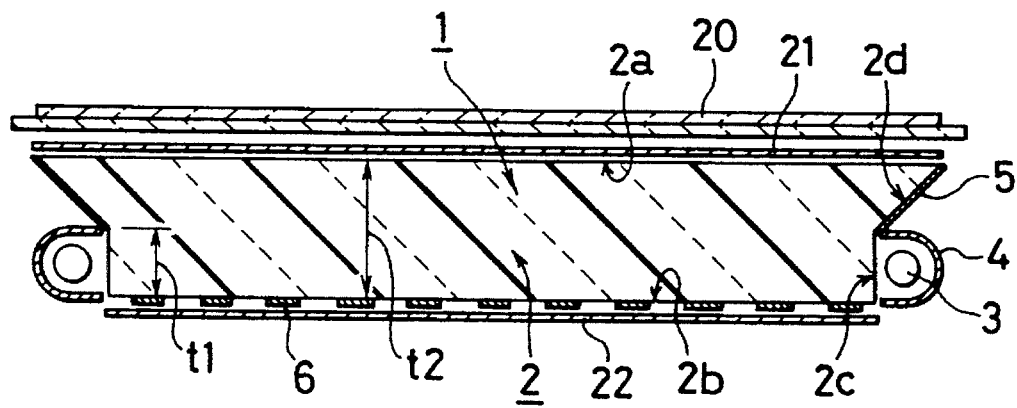
FIG. 2 is a cross sectional view along a line A—A shown in FIG. 1.

Next, the invention will be described in detail based upon an embodiment shown in drawings below. A reference number 1 shown in FIGS. 1 and 2 designates a flat lighting device according to the invention, and this flat lighting device 1 is basically similar to the conventional one in that it comprises a light transmission member 2 comprising a luminous surface 2a, a reflection surface 2b and an incident surface 2c, a light source 3 such as a cold cathode fluorescent lamp and a reflecting mirror 4 covering the above-described light source 3.

Referring to the shape of the above-described light transmission member 2 according to the invention, the luminous surface 2a is formed so that the area is approximately equal to the display area of a liquid crystal display 20. However, the thickness t2 between the luminous surface 2a and the reflection surface 2b is increased by an appropriate amount with respect to that of the conventional light transmission member, preferably wider than that of the incident surface 2c. The appropriate amount will be described later.

The incident surface 2c for taking in light from the light source 3 and the reflecting mirror 4 is provided to the light transmission member 2 of which the thickness is increased to t2 as described above, at this time said incident surface 2c is provided in contact with the reflection surface 2b at the lower end, and in addition, said light source 3 and the reflecting mirror 4 are provided closer to the center of said light transmission member 2 inside the end of said luminous surface 2a.

Therefore, as the upper end of the incident surface 2c is located inside the end of the luminous surface 2a, an inclined surface 2d is formed by connecting these in a line, and reflection coating 5 with a reflection function is formed on this inclined surface 2d by sticking, for example aluminum foil with excellent reflection performance or applying white paint.

The flat lighting device according to this embodiment is similar to the conventional one in that a dotted reflecting pattern 6 is formed on the above-described reflection surface 2b as in the conventional embodiments, for example by white ink. In addition a diffusing plate 21 is provided between the above-described luminous surface 2a and the liquid crystal display 20, and a reflecting plate 22 is provided on the rear side of the above-described reflecting pattern 6.

Next, referring to the action and effect of the flat lighting device 1 constituted as described above according to the invention, a part of direct light incident from the light source 3 through the incident surface 2c on one side or reflected light after emitting from the light source 3 and reflected by the reflecting mirror 4 is reflected by the reflecting pattern 6 provided on the above-described reflection surface 2b and goes on toward the luminous surface 2a, a part repeats internal reflection between the luminous surface 2a and the reflection surface 2b and reaches the inclined surface 2d on the other side.

At this time, the above-described inclined surface 2d directs light to the luminous surface 2a because the reflection coating 5 with a reflection function is formed on the inclined surface. Though the reflection surface 2b and the reflecting pattern 6 are not provided on the luminous surface 2a adjacent to this inclined surface 2d, the above-described inclined surface 2d and the reflection coating 5 reflect light in place of them, and light is emitted from the entire luminous surface 2a. Therefore, the flat lighting device 1 according to the invention can be formed so that it has the approximately equal area to the display area of the liquid crystal display 20 for lighting.

Figure 3:
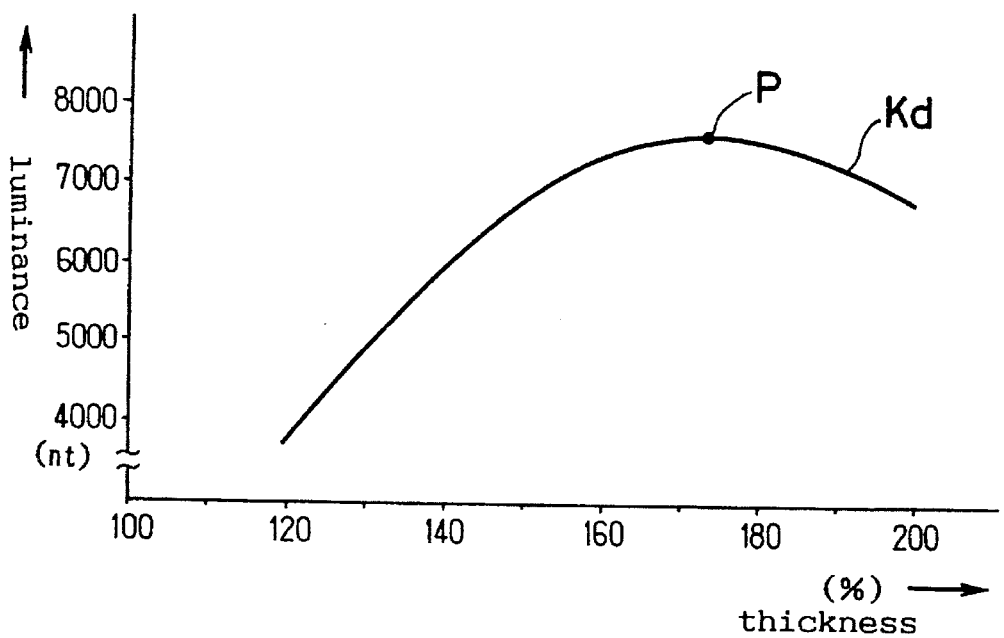
FIG. 3 is a graph showing the relationship between the thickness of the light transmission member according to the same embodiment and the luminance of a luminous surface.

FIG. 3 is a graph showing the result of experiments performed by the inventors to accomplish the invention and this graph shows change of luminance Kd of the luminous surface 2a adjacent to the inclined surface 2d when the thickness t2 of the above-described light transmission member 2 is increased gradually based upon the width t1 between the upper and lower ends of the incident surface 2c.

FIG. 3 shows that as the thickness t2 of the light transmission member 2 is gradually increased based upon the width t1 between the upper and lower ends of the incident surface 2c, luminance Kd also increases, the tendency of increase lasts until the thickness t2 reaches approximately 170% of the width t1 between the upper and lower ends of the incident surface 2c, when the thickness reaches approximately 170%, the luminance shows the maximum value P, and further, as the thickness t2 is increased, the luminance starts to decrease.

Referring to a procedure for setting the thickness t2 of the light transmission member 2, the luminance of the reflection surface 2b on the rear side of the luminous surface 2a is first measured, and the entire luminous surface 2a can be kept uniform luminance by setting the thickness t2 in which the same luminance Kd as the measured luminance can be measured.

As luminance Kd shows a characteristic that it has the maximum value P as described above when thickness t2 is changed, the thickness t2 in which an appropriate value can be obtained exists on both sides of the above-described maximum value P. However, the thickness t2 on the side through the maximum value P is naturally thicker than the thickness t2 before the maximum value P.

Adoption of the thickness t2 on the side through the maximum value P so as to obtain a similar appropriate value causes enlargement and increase in weight of the flat lighting device 1 due to increase in thickness t2 of the light transmission member 2, which is absurd. Therefore, in the invention, the range in which thickness t2 can be selected is limited up to the vicinity before the maximum value P.

Figure 4:
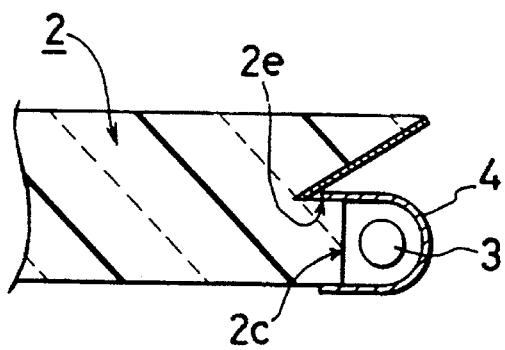
FIG. 4 is a cross sectional view of another embodiment of a flat lighting device according to the present invention.

FIG. 4 shows another embodiment of the flat lighting device 1 according to the invention. In the first embodiment described above, the upper end of the incident surface 2c is connected to the inclined surface 2d, however, in this embodiment the above-described incident surface 2c protrudes so that the above-described reflecting mirror 4 can be attached readily and at the upper and lower ends of this incident surface 2c, steps 2e for attachment are provided.

Figure 5:
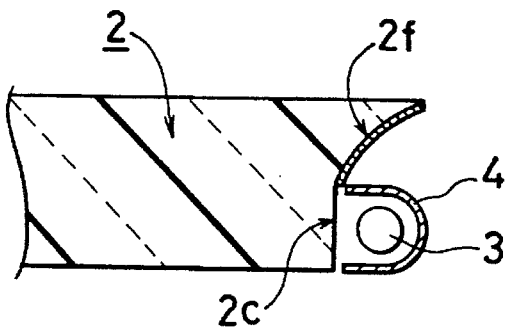
FIG. 5 is a cross sectional view of a further embodiment of a flat lighting device according to the present invention.
Figure 6:
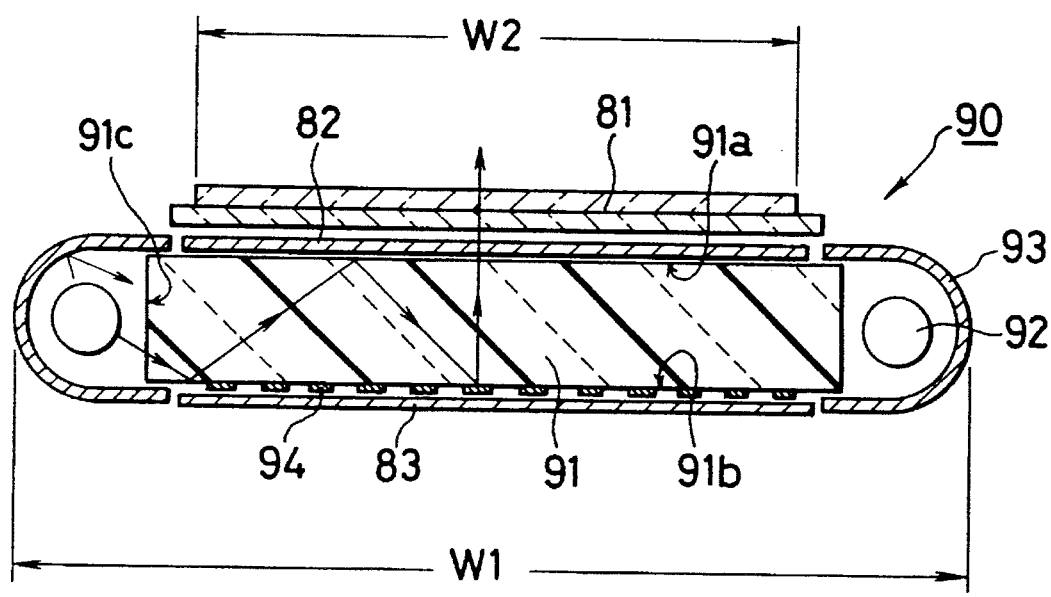
FIG. 6 is a cross sectional view showing the conventional flat lighting device.

FIG. 5 shows the other embodiment of the flat lighting device 1 according to the invention. In any embodiment described above, the inclined surface 2d is formed in a straight line, however, in this embodiment an inclined surface 2f is formed in the shape of, for example a circular arc, a parabolic curve or a free curve, and unevenness of luminance on the luminous surface 2a caused by reflection of light by this inclined surface 2f can be decreased owing to the shape of the inclined surface 2f.

As described above, according to the invention, the flat lighting device wherein the light transmission member is thickened between the luminous and reflection surfaces, the lower end of the incident surface is in contact with the reflection surface, the light source and the reflecting mirror are provided closer to the center of the light transmission member inside the end of the luminous surface, the inclined surface is formed by connecting the upper end of the above-described incident surface and the end of the luminous surface, and a reflection function is provided to the inclined surface can be provided, the luminous surface can be more luminous owing to reflection by the inclined surface, the flat lighting device can be formed so that the area is approximately equal to the display area of the liquid crystal display for lighting, and therefore, the entire system comprising this type of display can be downsized.

The condition of design of the above-described flat lighting device can be optimized by limiting the thickness of the light transmission member to 120 to 200% of the thickness of the incident surface so as to avoid unnecessary enlargement and increase in weight.

What is claimed is:

1. A flat lighting device comprising a light transmission member formed by transparent material having a high refractive index, said light transmission member having a luminous surface formed on a front side thereof so that the area of the luminous surface is approximately equal to that of a display for lighting, a reflection surface on the rear side of said luminous surface, and an incident surface, a light source and a reflecting mirror in the vicinity of the side perpendicular to said luminous surface, said flat lighting device being characterized in that the thickness of said light transmission member between said luminous and reflection surfaces is increased wider than that of said incident surface, said incident surface of which lower end is in contact with the reflection surface is provided closer to the center of the light transmission member so that the light source and reflecting mirror are inside said luminous surface, an inclined surface is formed by connecting the upper end of said incident surface and the end of the luminous surface, and said inclined surface is provided with a reflection function.

2. A flat lighting device according to claim 1, wherein the thickness of said light transmission member is equivalent to 20 to 200% of that of said incident surface.

* * * * *

UNITED STATES PATENT AND TRADEMARK OFFICE
CERTIFICATE OF CORRECTION

PATENT NO. : 5,617,251
DATED : April 1, 1997
INVENTOR(S) : Kazushige Ohta, et al.

It is certified that error appears in the above-indentified patent and that said Letters Patent is hereby corrected as shown below:

Column 6, line 2, "20-200%" should read --120-200%--.

Signed and Sealed this

Twenty-eighth Day of July, 1998

Attest:

BRUCE LEHMAN

Attesting Officer

Commissioner of Patents and Trademarks